United States Patent [19]

Kaeufer et al.

[11] Patent Number: 5,133,922
[45] Date of Patent: Jul. 28, 1992

[54] PROCESS FOR THE PRODUCTION OF PANELS, WEBS, AND PROFILES FROM PLASTIC MATERIALS

[75] Inventors: Helmut Kaeufer, Mettmann; Janos Muennich, Berlin, both of Fed. Rep. of Germany

[73] Assignees: Kraftanlagen AG, Heidelberg; Deutsche Solvay Werke GmbH, Solingen, both of Fed. Rep. of Germany

[21] Appl. No.: 715,750

[22] Filed: Jun. 17, 1991

Related U.S. Application Data

[63] Continuation of Ser. No. 402,644, Sep. 5, 1989, abandoned, which is a continuation of Ser. No. 112,175, Oct. 26, 1987, abandoned.

[30] Foreign Application Priority Data

Oct. 24, 1986 [DE] Fed. Rep. of Germany ....... 3636206

[51] Int. Cl.⁵ .............................................. B29C 55/18
[52] U.S. Cl. ..................................... 264/280; 264/291
[58] Field of Search .......................... 264/1.3, 280, 291

[56] References Cited

U.S. PATENT DOCUMENTS

| | | | |
|---|---|---|---|
| 2,354,243 | 7/1944 | Blake | 264/1.3 |
| 2,706,310 | 4/1955 | Eckler et al. | 264/280 |
| 3,083,410 | 4/1963 | McGlamery | 264/294 |
| 4,514,351 | 4/1985 | Kaeufer et al. | 264/210.2 |
| 4,587,163 | 5/1986 | Zachariades | 264/280 |

FOREIGN PATENT DOCUMENTS

| | | | |
|---|---|---|---|
| 577185 | 6/1959 | Canada | 264/280 |
| 686454 | 5/1964 | Canada | 264/280 |
| 117069 | 10/1978 | Japan | 264/280 |
| 57627 | 4/1982 | Japan | 264/280 |
| 45027 | 3/1983 | Japan | 264/280 |
| 965232 | 7/1964 | United Kingdom | 264/280 |

OTHER PUBLICATIONS

*Principles of Polymer Processing*, Tadmor et al., John Wiley and Sons, 1979, pp. 36–39 (AU137).
Kirk–Othmer, *Concise Encyclopedia of Chemical Technology*, John Wiley & Sons, New York (1985) p. 902.
DIN 53445, Torsion vibration test, pp. 172–175.
DIN 53445, Specific heat, pp. 232–233.
Wittfoht, Plastics Technical Dictionary, pp. 204–205, (1956).

*Primary Examiner*—James Lowe
*Attorney, Agent, or Firm*—Foley & Lardner

[57] ABSTRACT

A process for the production of panels, webs, panel-like moldings or profiles from plastics, of high mechanical strength owing to a molecular orientation by compressive roll-stretching within the nip of at least one pair of pressure or compression rolls at roll and material temperatures below the crystallite melting point or the softening point of the plastic and above 303° K under compressive stretching. The compressive roll-stretching of the panels, webs, panel-like moldings or profiles takes place with the same or approximately the same circumferential speed of the pressure or compression rolls or without friction at pressures of 20 to 250 MPa, at a degree of compressive stretching of over 1.1.

59 Claims, 3 Drawing Sheets

PROCESS FOR THE PRODUCTION OF PANELS, WEBS, AND PROFILES FROM PLASTIC MATERIALS

CROSS REFERENCE TO RELATED APPLICATIONS

This application is a continuation, of application Ser. No. 07/402,644, filed Sep. 5, 1989, and now abandoned, which is a continuation of application Ser. No. 07/102,175 filed Oct. 26, 1987 and now abandoned.

BACKGROUND OF THE INVENTION

1. Field of the Invention

The present invention relates to a process and apparatus for the production of panels, webs, panellike moldings or profiles from plastic materials, preferably thermoplastics, of high mechanical strength. The process provides a molecular orientation by compressive roll-stretching within the nip of at least one pair of pressure or compression rolls at roll and material temperatures below the crystallite melting point or the softening point of the plastic and above 303° K. under compressive stretching. With the aid of this process and the apparatus, the mechanical properties of the panels, webs, panel-like moldings or profiles can be successfully improved.

2. Description of Related Art

European Patent No. 0 051 730 discloses a process for the production of panels, sheets, webs, strips, profiles or panel-like or sheet-like moldings of high mechanical strength from thermoplastic materials by compressive stretching within the nip of several pairs of pressure rolls under the crystallite melting point or softening point of the thermoplastic. At least one pair of compression rolls of the compression roll unit used for the compressive stretching briefly exert a line load of 100 N/cm–900 N/cm, preferably 150 N/cm–850 N/cm, on prefabricated panels, sheets, webs, strips, profiles, panel-like or sheet-like moldings or on panel-like, sheet-like, web-like, strip-like or profile-like preforms, coming out of the extruder, in the nip of the pair of compression rolls. After the first brief compressive stretching operation, while still within the regeneration time of the fatigue effect of the pressurized region and/or the relaxation time of the elastic recovery of the pressurized region of the thermoplastic, following the expiry of a time interval of between 5 s and 5 min, preferably between 20 s and 3 min, the workpieces are subjected to one or more further brief compressive stretching and/or subsequent compressive handling operations in the nip of one or more further pairs of compression rolls with a smaller line load of 75 N/cm to 700 N/cm, preferably 80 N/cm to 650 N/cm. The temperature of these rolls or pairs of rolls is equal to or less than the temperature of the first compression roll unit used for compressive stretching, the pressure is varied as a function of the nip, and the nip preferably has the same width as the upstream pair of compression rolls for compressive stretching.

However, in the application of this process it has been found to be disadvantageous that, when using the line loads of 100 N/cm to 900 N/cm, the desired properties are not achieved to the full extent in the case of all thermoplastic materials and in the case of all roll temperatures specified within the temperature range and/or relatively frequent or numerous passes may become necessary within the relaxation period. Furthermore, there is the difficulty that, to achieve the specified advantages, depending on the thermoplastic and temperature, usually only panels up to a small width, for example, a strip up to 20 cm or up to 25 cm, could be compressively treated.

SUMMARY OF THE INVENTION

It is therefore an object of the present invention to avoid the abovementioned disadvantages and to develop an improved process and an improved apparatus.

According to a particular object of the invention, the mechanical properties of the compressive-stretched panels, webs or panel-like moldings or profiles are to be improved by use of the process and of the apparatus of the invention.

It is also an object of the invention to provide an apparatus which makes it possible to obtain compressive-stretched panels, webs, panel-like moldings and profiles having the desired properties with low plant and production expenditure.

In accordance with one aspect of the present invention, there has been provided a process for the production of panels, webs, panel-like moldings or profiles of high mechanical strength from a plastic material, comprising the step of molecularly orienting a plastic workpiece by conducting a first compressive roll-stretching within a nip of at least one pair of pressure or compression rolls at roll and material temperatures below the crystallite melting point or the softening point of the plastic material and above 303° K., wherein the compressive rollstretching of the workpiece takes place with the same or approximately the same circumferential speed of the pressure or compression rolls or without friction at a pressure of from about 50 to 250 MPa, and at a degree of compressive stretching of at least about 2.1.

In accordance with another aspect of the invention, there is provided a process for the production of panels, webs, panel-like moldings or profiles of high mechanical strength from a plastic material comprising the step of molecularly orienting a plastic workpiece by conducting a compressive roll-stretching within the nip of at least one pair of pressure or compression rolls at roll and material temperatures below the crystallite melting point or the softening point of the plastic, wherein the compressive roll-stretching takes place at the same or approximately the same circumferential speed of the pressure or compression rolls or without friction, at a pressure of from about 20 to 150 MPa, and at a temperature of above about 333° K. (calculated as material temperature) and at a degree of stretching of above about 1.1.

In accordance with still another aspect of the invention, there has been provided an apparatus for the production of panels, webs, panel-like moldings or profiles of high mechanical strength from a workpiece of plastic material, comprising at least one pair of pressure rolls, wherein one roll of each pair is rotatably supported in bearing means which are adjustable at least in height; means for regulating the temperature of the roll surface; and means in connection with the bearing means in the adjustable roll for receiving a line load in the nip of from about 950 N/mm to 5,500 N/mm.

Further objects, features and advantages of the present invention will become apparent from the detailed description of preferred embodiments that follows, when considered together with the attached figures of drawing.

DETAILED DESCRIPTION OF PREFERRED EMBODIMENTS

Figure 1:
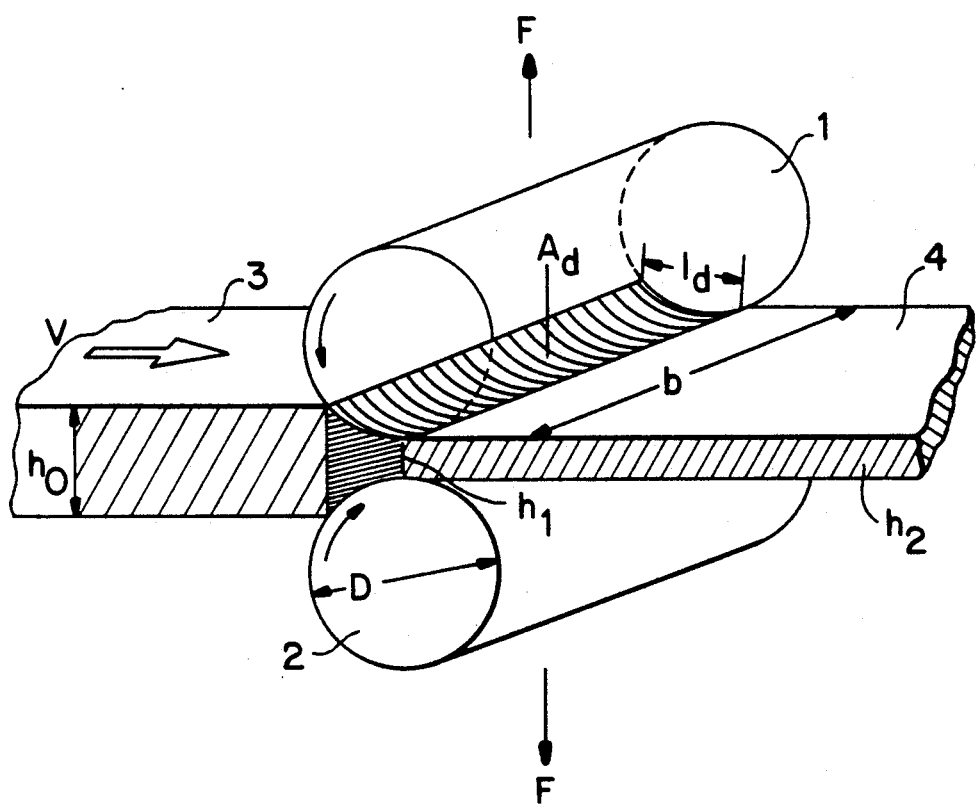
FIG. 1 is a schematic perspective view of the compressive roll-stretching apparatus according to the invention.

The invention comprises a process for the production of panels, webs, panel-like moldings or profiles of plastic materials, preferably thermoplastic materials, of high mechanical strength owing to a molecular orientation. The process comprises compressive roll-stretching within the nip of at least one pair of pressure or compression rolls at roll and material temperatures below the crystallite melting point or the softening point of the plastic and above 303° K. under compressive stretching.

According to the invention, the compressive roll-stretching of the panels, webs, panel-like moldings or profiles takes place with the same or approximately the same circumferential speed of the pressure or compression rolls or without friction at pressures of 50 to 250 MPa, preferably 90 to 150 MPa, at a degree of compressive stretching (ratio of the feed panel thickness or material thickness before pressing to the final panel thickness or material thickness after pressing) of over 2.1 (degree of compressive stretching after one or more compressive stretching operations).

According to a further preferred embodiment of the process according to the invention, the compressive roll-stretching of the panels, webs, panel-like moldings or profiles is carried out at the same or approximately the same circumferential speed of the pressure or compression rolls or without friction, the compressive roll-stretching taking place at pressures of 20 to 150 MPa, preferably 25 to 145 MPa, and at temperatures of over 333° K., preferably over 353° K., (calculated as material temperature) and/or with accompanying use of tensile forces and at a degree of stretching (ratio of the feed panel thickness or material thickness before pressing (with or without additional tensile stretching) to the final panel thickness or material thickness after pressing (with or without additional tensile stretching) of over 1.1, preferably over 1.3.

According to the invention, the pair of pressure or compression rolls exerts over or onto a width of the panel, web, the panel-like molding or profile of 300 to 3000 mm, preferably 500 to 2500 mm, a rolling force (sum of the forces acting on the bearings of a pressure or compression roll), greater than 60,000 N, preferably greater than 190,000 N.

With the aid of the compressive rollstretching process according to the invention, panels, webs, panel-like moldings or profiles or corresponding semi-finished products from bulk plastics are macromolecularly oriented, so that a consolidating effect (internal strengthening) is induced in the resultant product (finished or semifinished product). Using the process according to the invention, the material is modified during compressive stretching. Consequently, the semifinished products gain better deformability, the finished products gain multiplied, oriented strength, higher surface hardness, improved optical, chemical properties and the like.

According to a preferred embodiment of the process, a rolling force (sum of the forces acting on the bearings of a pressure or compression roll) of $2 \times 10^5$ N–$9 \times 10^6$ N, preferably $4 \times 10^5$ N–$8 \times 10^6$ N, is exerted in the nip on the panel, web, the panel-like molding or the profile, the rolling force to be applied depending directly on the roll-loaded width of the panel, web, panel-like molding or profile and the roll radius and the difference between feed panel thickness or feed profile thickness and the nip height, preferably directly on the roll-loaded width of the panel, web, panel-like molding or of the profile and the square root of the product of the roll radius and the difference between feed panel thickness or feed profile thickness and the nip width.

According to a further preferred embodiment of the process according to the invention, a rolling force (sum of the forces acting on the bearings of a pressure or compression roll) of $7 \times 10^4$ N –$1.9 \times 10^5$ N, preferably $1 \times 10^5$ N–$1.9 \times 10^5$ N, is exerted in the nip on the panel, web, the panel-like molding or the profile. The rolling force to be applied depends directly on the roll-loaded width of the panel, web, panel-like molding or profile and the roll radius and the difference between feed panel thickness or feed profile thickness and the nip height, preferably directly on the roll-loaded width of the panel, web, panel-like molding or profile and the square root of the product of the roll radius and the difference between feed panel thickness or feed profile thickness and the nip height. The compressive roll-stretching takes place at pressures of 20 to 150 MPa, preferably 25 to 145 MPa, at temperatures of over 333° K., preferably over 353° K. (calculated as material temperature) and/or with accompanying use of tensile forces and at a degree of compressive stretching (ratio of the feed panel thickness or material thickness before pressing to the delivery panel thickness or material thickness after pressing) of over 1.1, preferably over 1.3.

According to a further preferred embodiment of the process according to the invention, a degree of compressive stretching of 2.3 to 10, preferably 2.5 to 8, is maintained. Furthermore, the degree of compressive stretching is set preferably as a function of the nip height, the roll radius and/or the width of the panel, web, panel-like molding or profile, the number and direction(s) of the compressive roll-stretching operations, the roll and material temperatures and/or the roll speed.

The achievement of such high degrees of compressive stretching (ratio of the feed panel thickness or material thickness before pressing to the final panel thickness or material thickness after pressing) using still higher pressures was not to be expected on the basis of European Patent No. 0 051 730, and was not suggested, since, according to that patent, when still higher line loads were used, the compression rolls or calender rolls did not withstand the still higher pressure ranges, so that in this case the approach via several or numerous successive compressive pressing operations within the relaxation times was chosen. On the basis of European Patent No. 0 051 730, it was also not suggested to carry out several compressive roll-stretching operations under still greater pressure, since it is known that the thermoplastics can be "rolled dead" at excessive pressures (occurrence of embrittlement effects, flaky surfaces, structural cracks, brittleness or fracture) (cf. European Patent No. 0 051 730, page 3, lines 12 and 13). In comparison, much higher line loads, namely line loads of 950 N/mm to 5,500 N/mm, preferably 1,200 N/mm to 5,000 N/mm, are applied according to the present invention, in order to achieve the desired advantages, degree of compressive stretching and the like. In this case, compression rolls and/or support rolls must be used which are improved in comparison with the conventional plastics calender or plastic compression rolls used and which have a higher resistance to flexure.

According to the process of the invention, in the case of successive compressive roll-stretching operations (preferably within the relaxation time), a temperature conditioning, preferably heat transfer, to the panel, web, plate-like molding or profile takes place directly or indirectly through at least one compression roll and/or support roll, preferably with the use of bore holes and/or channels arranged inside or in the vicinity of the surface of at least one compression or support roll, for heat regulation liquids, preferably for heat transfer liquids, and/or by temperature control by means of radiation and/or contact heating. According to a preferred embodiment, a temperature conditioning of the panel, web, panel-like molding or profile takes place upstream and/or downstream of the compressive rollstretching, preferably using an apparatus to avoid any heat dissipation to the surroundings.

Depending on the type of plastic, on the pressure applied in the compression, of 50 to 250 MPa or 20 to 49.9 MPa, preferably 90 to 150 MPa or 25 to 49.9 MPa, the temperatures and the like, one compressive stretching by a pair of compression rolls may already be sufficient using the process conditions according to the invention to obtain the mechanical improvement. However, in order to minimize the recovery of the material and to improve considerably the mechanical properties, it is preferred to subject the panel, web, panel-like molding or profile, (preferably in the relaxation time or time of the elastic recovery of the plastic or thermoplastic) after the first compressive stretching in the pair of compression rolls to at least one further compressive stretching operation by compressive rolling (cf. European Patent No. 0 051 730 for time interval of the relaxation time).

Relaxation time or time of elastic recovery of the thermo-plastic is understood as the time within which a reduced elastic damping of the pressurized point of the thermo-plastic coming out of the nip develops. The time of the elastic or spontaneous elastic recovery (relaxation time or regeneration time) is dependent, inter alia, on the processing conditions or the exposure conditions (compressive roll-stretching temperature, chosen line load etc.) and on the respective thermoplastic (depending on external conditions, the relaxation time need not be identical to the time of molecular relaxation).

The higher the chosen compressive rollstretching temperature within the process according to the invention, the longer the regeneration or relaxation time. On the other hand, the firmer the thermoplastic, or the lower the chosen compressive roll-stretching temperature, the faster the slight elastic damping reverts.

The panels, webs, panel-like moldings or profiles produced by the process according to the invention have improved mechanical properties, inter alia, improved impact strength and the like. They can be used directly or subjected to a subsequent forming process (preferably pressing, deformation, drawing and the like). According to the invention it has been established that the forming processes subsequently carried out are to be at least 3%, preferably more than 6%, below the material temperatures used in the compressive roll-stretching operation, in order that the orientations achieved are not lost, it being possible in special cases even for the compressive roll-stretching temperatures to be exceeded during deformation.

The plastic produced by the process according to the invention, preferably an internally strengthened plastic, may be used as an engineering plastic, with preference in the fields of the mechanical engineering, aircraft and automotive industries as well as the construction industry. These internally strengthened plastic moldings offer on the one hand improvements in their properties and enable industrial moldings to perform new functions, and on the other hand they have a low specific gravity and thus contribute a further energy saving in the case of automobiles.

The plastic materials compressively roll-stretched by the process and apparatus according to the invention have better mechanical, optical and chemical properties, such as for example multiplied strength and impact strength, better low-temperature resistance, increased transparency, higher surface hardness and wear resistance, better barrier properties and easier deformability.

With the aid of the compressive roll-stretching process according to the invention, high molecular orientations are introduced into panels, webs, panel-like moldings or profiles produced by usual molding processes from bulk plastics, which orientations induce a consolidating effect (internal strengthening) in the resultant product (finished product or semi-finished product). The material is thus modified during molding. As a result, these semifinished products gain better deformability, the finished products gain multiplied, oriented strength, higher surface hardness, improved optical, chemical properties and the like.

These oriented thermoplastic moldings can take the place of moldings of fiber-reinforced plastics, composite structures and metal parts. Such moldings namely have a price advantage over metals (due to raw materials and production), a lower specific gravity and corrosion resistance, and there is additionally a considerable price advantage compared with high-grade industrial plastics or blends.

Fiber-reinforced webs, panels and the like and other composite systems have the disadvantage that their individual components can only be separated with difficulty, and the resulting unusable parts and other waste have to be dumped or fed to the pyrolysis. They can be replaced substantially by internally strengthened panels, webs, panel-like moldings or profiles from the process according to the invention, so that an ecologically safe recycling of the raw materials is possible, since oriented single-material systems can be directly reprocessed. Owing to the increased strength, it is also possible to use designs with smaller dimensions (thinner wall thicknesses) than in the case of conventional plastic moldings. This leads to material and weight savings.

According to a preferred embodiment of the process, the panel, web, panel-like molding or profile is, preferably within the relaxation time, following the first or several compressive roll-stretching operations, swung in the plane of the nip through an angle, preferably through 90°, with respect to the running direction and, with setting of a similar, preferably reduced nip height in comparison to the preceding pressing operation, is passed at least once more through a pair of compression rolls. The passage through at least one pair of compression rolls after the swinging or turning through an angle, preferably through 90°, preferably takes place within the abovementioned relaxation time. This process measure makes it possible for biaxially oriented panels, webs, panel-like moldings or profiles to be obtained.

According to another preferred embodiment, the panel, web, panel-like molding or profile is, preferably within the relaxation time, following the first or several compressive roll-stretching operations, swung in the plane of the nip through 10° to 80° with respect to the running direction, with setting of a similar, preferably reduced nip height in comparison to the preceding compressive roll-stretching operation, is initially passed through a pair of compression rolls and subsequently, swung once more mirror-invertedly with respect to the running direction, and is passed with a similar, preferably reduced nip height, through a pair of compression rolls. By setting the angle of the swinging or turning, the degree of the biaxial orientation can also be determined.

According to another preferred embodiment, the panel, web, panel-like molding or profile is, preferably within the relaxation time, following the first or several compressive roll-stretching operations, passed by a reversible drive in the opposite direction, with setting of a similar, preferably reduced nip height in comparison to the preceding pressing operation, through a pair of compression rolls, preferably through the same pair of compression rolls. In the case of this embodiment, several pairs of compression rolls arranged one after the other or one alongside the other can be avoided.

According to another embodiment of the process according to the invention, the panel, web, panellike molding or profile is pressurized and compressively roll-stretched by at least one first pair of compression rolls, arranged at an angle of 1 to 89°, preferably 45°, with respect to the running direction of the same, and subsequently by at least one further pair of compression rolls, arranged at an angle of 91° to 179°, preferably 135°, with respect to the running direction. In the case of this embodiment, a quasi biaxial molecular orientation is achieved in one pass. After, during or before the passage of the pressurized area through a pair of rolls or one or more drawing devices, preferably through the last pair of compression rolls, a tensile force is preferably exerted in the running direction on the panel, web, panel-like molding or profile.

The invention further relates to an apparatus for the production of panels, webs, panel-like moldings or profiles from plastic materials, preferably a thermoplastic, of high mechanical strength owing to a molecular orientation by compressive roll-stretching within the nip with at least one pair of pressure or compression rolls. According to the invention, the apparatus comprises one or more pairs of pressure rolls, of which in each case one roll is rotatably supported or borne preferably in fixed bearing bodies (or bearing sides), while the other roll is mounted in bearing bodies (or bearing sides) which are adjustable in height, depth and/or sideways. Furthermore, the apparatus preferably includes at least one device for adjustable temperature control, preferably heating of the roll surface and/or the devices, preferably mechanical and/or hydraulic devices, in connection with the bearing bodies in the adjustable roll for receiving a linear load in the nip of 950 N/mm to 5,500 N/mm, preferably 1,200 N/mm to 5,000 N/mm.

At least one pair of compression rolls of the apparatus and/or this pair in combination with at least two support rolls has an increased resistance to flexure or an increased bending resistance at pressures of 50 to 250 MPa, preferably 90 to 150 MPa.

According to a further preferred embodiment of the apparatus according to the invention, the apparatus includes at least one pair of compression rolls and/or this pair in combination with at least two support rolls for an increased resistance to flexure or an increased bending resistance at pressures of 20 to 49.99 MPa, preferably 25 to 49.9 MPa. This embodiment is used, inter alia. in the case of a temperature control at melt temperatures of over 333° K., preferably over 353° K.

According to a preferred embodiment, bore holes or channels are arranged inside or in the vicinity of the surface of at least one compression roll and/or support roll for a heat transfer liquid and/or arrangement of at least one heat radiator and/or of one contact band heater, preferably on or in the vicinity of one or more pressure or compression rolls and/or nozzles for the direct supply of a heat transfer medium, preferably of a heat transfer liquid, to the pressure or compression rolls, support rolls and/or the panels, webs, panellike moldings or profiles. This makes a precise heat conduction possible before, during and after compressive roll-stretching.

According to the invention, the apparatus includes one or more separately arranged or combined devices for transport, further processing and/or directional changing, incorporated upstream of, between and/or downstream of the pairs of rolls.

According to a further, different preferred embodiment, at least one pair of pressure or compression rolls is arranged in combination with at least one stretching or drawing apparatus, in order to achieve an increased molecular orientation in the drawing direction.

Having a rotating or turning apparatus downstream of at least one pair of pressure or compression rolls makes it possible to carry out successfully a directional change of the compressively roll-stretched panels, webs, panel-like moldings or profiles to be further processed, so that the further running in a different direction can take place and other orientations can be achieved.

According to a further preferred embodiment, at least one reversible drive of the pair or pairs of rolls is provided. With the aid of this embodiment, for example, supplying additional pairs of compression rolls can be successfully avoided.

According to one embodiment, the arrangement and design of the bearing bodies of the pair of pressure or compression rolls takes place on a rack or frame structure such that each bearing side withstands a force in excess of $3.5 \times 10^4$ N, preferably in excess of $0.5 \times 10^5$ N.

However, it is preferred if the arrangement and design of the bearing bodies of the pair of pressure or compression rolls on a rack or frame structure is such that each bearing side (bearing side is the total number of bearing bodies on one roll side) withstands a force in excess of $1 \times 10^5$ N, preferably in excess of $2 \times 10^5$ N.

All plastics, preferably thermoplastics, for example polyvinylidene chloride, polyamide, polyacetal, polyvinylfluoride, thermoplastic polyester, polycarbonate, acrylonitrile-butadiene styrene polymers, polyvinylidene fluoride, preferably however polyvinyl chloride, polypropylene, polyethylene and their copolymers or blends can be used for the process according to the invention.

According to another embodiment of the apparatus according to the invention, at least one pair of compression rolls is arranged at an angle of 1 to 89°, preferably 45°, with respect to the running direction of the panel, web, panel-like molding or profile, and at least one further pair of compression rolls is arranged at an angle of 91° to 179°, preferably 135°, with respect to the running direction. With this apparatus according to the invention, a quasi biaxial molecular orientation can be successfully achieved in one pass.

According to a further embodiment, instead of at least one pair of compression rolls, 2 n+1 compression rolls (n=1 to 6, preferably 1 and 2) are arranged one above the other or one under the other and/or alongside one another, of which the first in each case and the 2 n+1th, preferably the first and third and/or fifth, has a drive in the same direction of rotation. With such a device, the compressive roll stretching can be carried out successfully with low plant expenditure and space requirement. In this arrangement, the first and third compression rolls are in each case preferably supported in bearing bodies which are adjustable in height, depth and/or breadth.

According to a further preferred embodiment, one or more support roll(s) is or are assigned to at least one compression roll, preferably several compression rolls, the diameter and/or bending resistance of which support rolls is greater than that of the associated compressive stretching rolls.

Embodiments of the apparatus according to the invention are diagrammatically represented in the accompanying FIGS. 1 to 5.

FIG. 1 diagrammatically represents a section through the compression roll 1 or pressure roll which is adjustable in height and depth and a fixedly mounted (but rotatable about an axis) compression roll 2. $A_d$ denotes the so-called compressed or pressed area, b denotes the width of the panel, web, panel-like molding or profile (designated by reference numeral 3 before pressing and, by 4 after pressing), D denotes the diameter of the compression rolls, $h_0$ the material thickness before pressing, $h_1$ the nip height and $h_2$ the final thickness.

Figure 2:
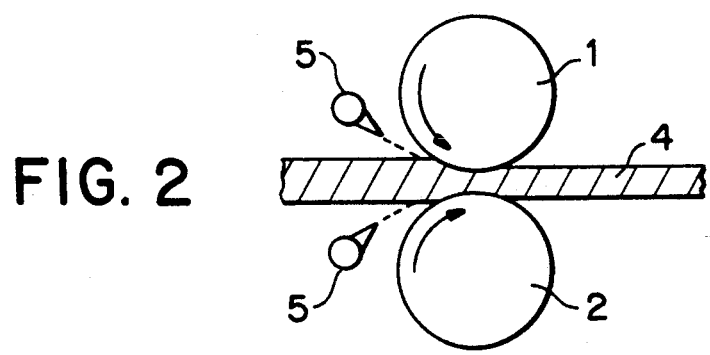
FIG. 2 is a schematic cross-sectional view of the compression rolls showing heat transfer nozzles.

FIG. 2 diagrammatically illustrates that nozzles 5 can be arranged upstream of the apparatus according to the invention, from which nozzles a heat transfer liquid or heat regulating liquid can be sprayed, which may be applied to the panel, web, panel-like molding or profile and/or to the compression rolls.

Figure 3:
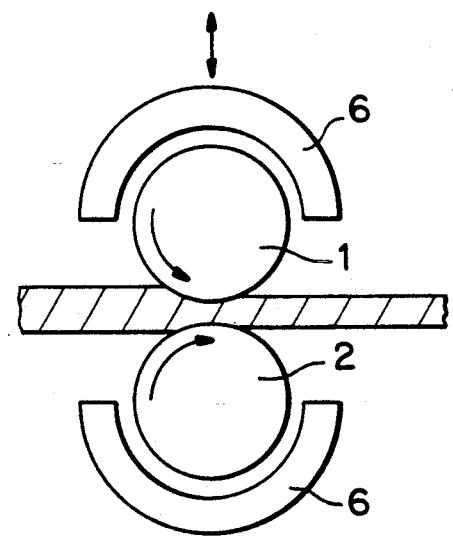
FIG. 3 is a schematic cross-sectional view of the rolls showing alternate heat transfer devices.

In FIG. 3, a heat radiator 6 is arranged such that it partially surrounds the compression rolls and/or support rolls.

Figure 4:
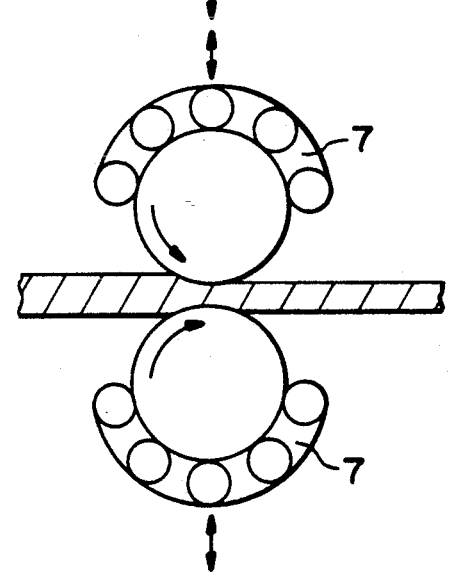
FIG. 4 is a view similar to FIG. 3 showing yet another alternative heat transfer device.

In FIG. 4, a peripheral band heater 7 partially surrounds the compression rolls.

Figure 5:
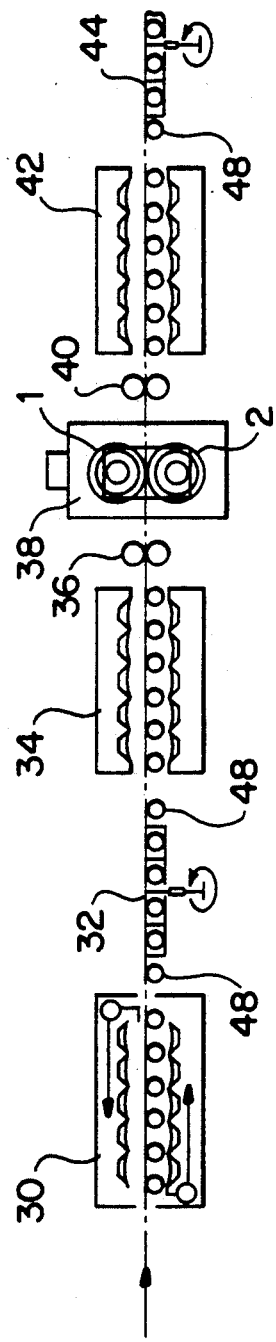
FIG. 5 is a schematic view of a processing line apparatus according to the invention.

FIG. 5 diagrammatically illustrates a device for the compressive roll-stretching of extruded thermoplastic panels. According to this representation, devices such as tension rolls, a roller transport line and turntable are connected upstream and downstream, mirror-invertedly of the compressive roll-stretching unit in order to carry out, by means of a reversible drive of the rolls of the compressive roll-stretching unit, compressive roll-stretching for different directions of molecular orientation with reciprocating passage on a single compressive roll-stretching unit.

The extruded thermoplastic panel is initially heated in a temperature control station 30 to the necessary rolling temperature and fed to a pair of tension rolls 36 via a first turntable 32 and a roller transport line 34. On the pair of tension rolls 36, the panel is introduced into the compressive roll-stretching unit 38 between the lower roller 2, which is fixedly arranged but rotatable about its axis, and the upper compression or pressure roll 1, which is adjustable in height and depth.

The adjustable upper roll 1 was set in advance with respect to the lower fixed roll 2 to the desired nip height, so that the material thickness of the panel decreases correspondingly during its passage between the rolls, while at the same time it is lengthened in the compressive stretching direction. The temperature of the roll surface is set correspondingly to the processed thermoplastic. When delivered out of the compressive roll-stretching unit 38, the panel is taken up by a second pair of tension rolls 40 and fed via a further roller transport line 42 to a turntable 44.

On the turntable, the panel is turned for a different direction of molecular orientation. For the compressive roll-stretching to be carried out for this purpose, the panel is then returned in the opposite direction, from right to left in the illustration, via the roller transport line 42 and the pair of tension rolls 40 into the compressive roll-stretching unit. Heat losses are balanced out in each case when running through the roller transport lines 34 and 42 as well as through the compressive roll-stretching unit 38, so that the temperature of the panel to be processed can be set, and this temperature can also be maintained during processing. Support rolls 48 are arranged between temperature control station 30 and turntable 32 as well as between the turntables 32, 44 and the roller transport line 34, 42.

The invention is further described with reference to the following non-limiting examples.

EXAMPLE 1

8 mm thick extruded boards of polypropylene underwent several compressive roll-stretching operations. The boards (starting panels) were preheated to 373° K., the roll surface temperatures were 393° K. The compressively roll-stretched panels thus produced were of 2 mm thickness. A degree of compressive stretching of 4 was achieved. The rolls had a diameter of 500 mm and a working width of 600 mm. The rolling force in this case was $1.7 \times 10^6$ N, the pressure was 100 MPa and the circumferential speed of the roll was 10 m/min.

The panels produced by the process according to the invention and with the apparatus according to the invention had a tensile strength (yield point) of 63 MPa and an elongation at yield of 380%.

The panels could be processed into moldings without any problems on a sheet press using a cold mold, without hold-down devices.

EXAMPLE 2

An extruded panel of polypropylene having a density of 0.9 g/cm³ (measured in accordance with DIN 53479) was compressively roll-stretched biaxially (five fold: alternately three times longitudinally and twice transversely).

| | | |
|---|---|---|
| v | 4 m/min | |
| $T_M$ | 101° C. | (preheating temperature, i.e. during the first rolling) |

-continued

| | | |
|---|---|---|
| $T_W$ 101° C. | (roll temperature) | |
| Nip height sequence: | | |
| $h_1 = 4$ mm | | |
| $h_2 = 2$ mm | | |
| $h_3 = 1.5$ mm | | |
| $h_4 = 1.0$ mm | | |
| $h_5 = 0.75$ mm | | |
| Panel dimensions: | | |
| s = thickness | | |
| l = length | | |
| b = width | | |
| $s_0 = 7.8$ mm | $l_0 = 400$ mm | $b_0 = 400$ mm |
| $s_1 = 6.0$ mm | $l_1 = 535$ mm | $b_1 = 405$ mm |
| $s_2 = 3.5$ mm | $l_2 = 520$ mm | $b_2 = 675$ mm |
| $s_3 = 2.8$ mm | $l_3 = 660$ mm | $b_3 = 660$ mm |
| $s_4 = 2.3$ mm | $l_4 = 655$ mm | $b_4 = 810$ mm |
| $s_5 = 2.0$ mm | $l_5 = 790$ mm | $b_5 = 800$ mm |

$\lambda$ = degree of compressive stretching = $S_n/S_{n+1}$
$\lambda 1 = 1.3$
$\lambda 2 = 1.7$
$\lambda 3 = 1.25$
$\lambda 4 = 1.22$
$\lambda 5 = 1.15$
Total degree of compressive stretching = 3.9
$\Delta h_1 = 3.8$ mm
$\Delta h_2 = 4.0$ mm
$\Delta h_3 = 2.0$ mm
$\Delta h_4 = 1.8$ mm
$\Delta h_5 = 1.55$ MPa The panels produced had improved mechanical properties.

EXAMPLE 3

The process as described in Example 2 was repeated, except that, pressures of 25.5 MPa were used.

EXAMPLE 4

An extruded panel of propylene homopolymer (ELTEX HF 100) was monoaxially subjected to compressive roll-stretching operations six times.

v (roll velocity) = 4 m/min
$T_M$ (average temperature of material surface) = 100° C.
$T_W$ (roll temperature) = 100° C.

| | | |
|---|---|---|
| Nip height sequence: | | |
| $h_1 = 4$ mm | $h_4 = 1.0$ mm | |
| $h_2 = 2$ mm | $h_5 = 0.75$ mm | |
| $h_3 = 1.5$ mm | $h_6 = 0.5$ mm | |
| Panel dimensions: | | |
| $s_0 = 7.8$ mm | $l_0 = 297$ mm | $b_0 = 506$ mm |
| $s_1 = 6.0$ mm | $l_1 = 383$ mm | $b_1 = 510$ mm |
| $s_2 = 3.7$ mm | $l_2 = 625$ mm | $b_2 = 510$ mm |
| $s_3 = 3.0$ mm | $l_3 = 750$ mm | $b_3 = 520$ mm |
| $s_4 = 2.7$ mm | $l_4 = 840$ mm | $b_4 = 525$ mm |
| $s_5 = 2.4$ mm | $l_5 = 840$ mm | $b_5 = 532$ mm |
| $s_6 = 2.3$ mm | $l_6 = 840$ mm | $b_6 = 535$ mm |

Total degree of compressive stretching = 3.4
$\Delta h_1 = 3.8$ mm  $\Delta h_4 = 2.0$ mm
$\Delta h_2 = 4.0$ mm  $\Delta h_5 = 1.95$ mm
$\Delta h_3 = 2.2$ mm  $\Delta h_6 = 1.9$ mm
roll force max = 980 kN (total)
bearing force = 490 kN (each bearing side)
line load/max = 1830 N/mm
Pressure (surface load) = 84 MPa (N/mm$^2$)

The tensile strength of the panel, especially in the longitudinal direction, was improved (105 MPa) after the compressive roll stretching.

What is claimed is:

1. A process for the production of fiber-free panels, webs, panel-like moldings or profiles of high mechanical strength from a plastic material which is a crystalline material or an amorphous material, comprising the sequential steps of:

a first compressive roll-stretching of a fiber-free plastic workpiece within a nip of at least one pair of pressure or compression rolls at roll and material temperatures below the melting point of said crystalline material or the softening range of said amorphous material and above 303° K., thereby to molecularly orient said workpiece, wherein the compressive roll-stretching of the workpiece takes place with the same or approximately the same circumferential speed of the pressure or compression rolls or without friction at a pressure of from about 50 to 250 MPa, and at a compressive stretching ratio of between about 2.3 and 10, a second step of conducting a second compressive roll-stretching, said second compressive roll-stretching comprising rotating the workpiece in the plane of the nip through an angle with respect to the running direction, setting a reduced nip height compared with the first compressive roll-stretching, and passing the workpiece through the nip of reduced height, and a third step of conducting a third compressive roll-stretching, said third compressive roll-stretching comprising rotating the workpiece mirror-invertedly in relation to the running direction, setting a second reduced nip height in relation to said second compressive roll-stretching, and passing the workpiece through the nip of the second reduced nip height.

2. A process according to claim 1, wherein said pressure is between about 90 and 150 MPa.

3. A process according to claim 1, wherein the pair of pressure or compression rolls exerts over a width of the workpiece of from about 300 to 3,000 mm.

4. A process according to claim 3, wherein the workpiece width is from about 500 to 2,500 mm and the rolling force is greater than about 190,000 N.

5. A process according to claim 4, wherein a rolling force of from about $2 \times 10^5$ N $- 9 \times 10^6$ N is exerted in the nip on the workpiece.

6. A process according to claim 1, wherein the degree of compressive stretching is between about 2.5 and 8.

7. A process according to claim 1, wherein a line load of from about 950 N/mm to 5,500 N/mm is applied to the workpiece.

8. A process according to claim 7, wherein the line load is from about 1,200 N/mm to 5,000 N/mm.

9. A process according to claim 1, further comprising the step of transferring heat to the workpiece directly through at least one of a compression roll and a support roll.

10. A process according to claim 1, further comprising the step of temperature conditioning the workpiece at least one of upstream and downstream of the first, second or third compressive roll-stretching step.

11. A process according to claim 1, wherein said second compressive roll-stretching is conducted within a time following said first compressive roll-stretching at which the workpiece has not yet relaxed.

12. A process according to claim 1, wherein said angle is between about 10 and 80°.

13. A process according to claim 1, further comprising the step of exerting a tensile force on the workpiece in the running direction, either after, during or before the passage of the workpiece through the air of rolls.

14. A process according to claim 1, wherein said plastic workpiece, prior to said compressive rollstretching, has a thickness in the range of about 2 to 8 mm.

15. A process according to claim 1, wherein said plastic workpiece comprises a three-dimensional molded body.

16. A process for the production of fiber-free panels, webs, panel-like moldings or profiles of high mechanical strength from a plastic material which is a crystalline material or an amorphous material, comprising the sequential steps of:

a first compressive roll-stretching of a fiber-free plastic workpiece within a nip of at least one pair of pressure or compression rolls at roll and material temperatures below the melting point of said crystalline material or the softening range of said amorphous material and above 303° K., thereby to molecularly orient said workpiece, wherein the compressive roll-stretching of the workpiece takes place with the same or approximately the same circumferential speed of the pressure or compression rolls or without friction at a pressure of from about 50 to 250 MPa, and at a compressive stretching ratio of between about 2.3 and 10, a second step of conducting a second compressive roll-stretching, said second compressive roll-stretching comprising re-setting the nip height of the original nip with a reduced nip height and reversing the workpiece to pass it through the original pair of compression rolls.

17. A process according to claim 16, wherein said pressure is between about 90 and 150 MPa.

18. A process according to claim 16, wherein the pair of pressure or compression rolls exerts over a width of the workpiece of from about 300 to 3,000 mm.

19. A process according to claim 18, wherein the workpiece width is from about 500 to 2,500 mm and the rolling force is greater than about 190,000 N.

20. A process according to claim 19, wherein a rolling force of from about $2 \times 10^5 \text{ N} - 9 \times 10^5 \text{ N}$ is exerted in the nip on the workpiece.

21. A process according to claim 16, wherein the degree of compressive stretching is between about 2.5 and 8.

22. A process according to claim 16, wherein a line load of from about 950 N/mm to 5,500 N/mm is applied to the workpiece.

23. A process according to claim 22, wherein the line load is from about 1,200 N/mm to 5,000 N/mm.

24. A process according to claim 16, further comprising the step of transferring heat to the work-piece directly through at lest one of a compression roll and support roll.

25. A process according to claim 16, further comprising the step of temperature conditioning the workpiece at lest one of upstream and downstream of the first or second compressive roll-stretching step.

26. A process according to claim 16, wherein said second compressive roll-stretching is conducted within a time following said first compressive roll-stretching at which the workpiece has not yet relaxed.

27. A process according to claim 16, further comprising the step of exerting a tensile force on the workpiece in the running direction, either after, during or before the passage of the workpiece through the pair of rolls.

28. A process according to claim 16, wherein said plastic workpiece, prior to said compressive rollstretching, has a thickness in the range of about 2 to 8 mm.

29. A process according to claim 16, wherein said plastic workpiece comprises a three-dimensional molded body.

30. A process for the production of fiber-free panels, webs, panel-like moldings or profiles of high mechanical strength from a plastic material which is a crystalline material or an amorphous material, comprising the sequential steps of:

a first compressive roll-stretching of a fiber-free plastic workpiece within a nip of at least one pair of pressure or compression rolls at roll and material temperatures below the melting point of said crystalline material or the softening range of said amorphous material and above 303° K., thereby to molecularly orient said workpiece, wherein the compressive roll-stretching of the workpiece takes place with the same or approximately the same circumferential speed of the pressure or compression rolls or without friction at a pressure of from about 50 to 250 MPa, and at a compressive stretching ratio of between about 2.3 and 10, a second step of conducting a second compressive roll-stretching, wherein said first compressive roll-stretching is done by at least one first pair of compression rolls, arranged at an angle of 1 to 89°, with respect to the running direction of the workpiece, and said second compressive roll-stretching is done by at least one second pair of compression rolls, arranged at an angle of 91 to 179° with respect to the running direction.

31. A process according to claim 30, wherein said first pair of rolls is arranged at an angle of 45°, and said second pair of rolls is arranged at an angle of 135°.

32. A process according to claim 30, wherein said pressure is between about 90 to 150 MPa.

33. A process according to claim 30, wherein the pair of pressure or compression rolls exerts over a width of the workpiece of from about 300 to 3,000 mm.

34. A process according to claim 33, wherein the workpiece width is from about 500 to 2,500 mm and the rolling force is greater than bout 190,000 N.

35. A process according to claim 34, wherein a rolling force of from about $2 \times 10^5 \text{ N} - 9 \times 10^6 \text{ N}$ is exerted in the nip on the workpiece.

36. A process according to claim 30, wherein the degree of compressive stretching is between about 2.5 and 8.

37. A process according to claim 30, wherein a line load of from about 950 N/mm to 5,500 N/mm is applied to the workpiece.

38. A process according to claim 37, wherein the line load is from about 1,200 N/mm to 5,000 N/mm.

39. A process according to claim 30, further comprising the step of transferring heat to the work-piece directly through at least one of a compression roll and support roll.

40. A process according to claim 30, further comprising the step of temperature conditioning the workpiece at least one of upstream and downstream of the first or second compressive roll-stretching step.

41. A process according to claim 30, wherein said second compressive roll-stretching is conducted within a time following said first compressive roll-stretching at which the workpiece has not yet relaxed.

42. A process according to claim 30, further comprising the step of exerting a tensile force on the workpiece in the running direction, either after, during or before the passage of the workpiece through the pair of rolls.

43. A process according to claim 30, wherein said plastic workpiece, prior to said compressive rollstretching, has a thickness in the range of about 2 to 8 mm.

44. A process according to claim 30, wherein said plastic workpiece comprises a three-dimensional molded body.

45. A process for the production of fiber-free panels, webs, panel-like moldings or profiles of high mechanical strength from a plastic material which is a crystalline material or an amorphous material, comprising the sequential steps of:

a first compressive roll-stretching of a fiberfree plastic workpiece within a nip of at least one pair of pressure or compression rolls at roll and material temperatures below the melting point of said crystalline material or the softening range of said amorphous material, thereby to molecularly orient said workpiece, wherein the compressive roll-stretching of the workpiece takes place with the same or approximately the same circumferential speed of the pressure or compression rolls or without friction, at a pressure of from about 20 to 150 MPa and a temperature of above about 333° K., calculated as material temperature, and at a compressive stretching ratio of above about 1.1, a second step of conducting a second compressive roll-stretching, said second compressive roll-stretching comprising rotating the workpiece in the plane of the nip through an angle with respect to the running direction, setting a reduced nip height compared with the first compressive roll-stretching, and passing the workpiece through the nip of reduced height, and a third step of conducting a third compressive roll-stretching, said third compressive roll-stretching comprising rotating the workpiece mirror-invertedly in relation to the running direction, setting a second reduced nip height in relation to said second compressive roll-stretching, and passing the workpiece through the nip of the second reduced nip height.

46. A process according to claim 45, wherein said temperature is above about 353 K, said pressure is from about 25 to 145 MPa and said compressive stretching ratio is above about 1.3.

47. A process according to claim 45, further comprising the step of applying a tensile force to the workpiece.

48. A process according to claim 45, wherein a rolling force (sum of the forces acting on the bearings of the pressure or compression roll) of from about $7 \times 10^4$ N–$1.9 \times 10^5$ N is exerted in the nip on the workpiece.

49. A process according to claim 48, wherein the rolling force is from about $1 \times 10^5$ N–$1.9 \times 10^5$ N.

50. A process for the production of fiber-free panels, webs, panel-like moldings or profiles of high mechanical strength from a plastic material which is a crystalline material or an amorphous material, comprising the sequential steps of:

a first compressive roll-stretching of a fiberfree plastic workpiece within a nip of at least one pair of pressure or compression rolls at roll and material temperatures below the melting point of said crystalline material or the softening range of said amorphous material, thereby to molecularly orient said workpiece, wherein the compressive roll-stretching of the workpiece takes place with the same or approximately the same circumferential speed of the pressure or compression rolls or without friction, at a pressure of from about 20 to 150 MPa and a temperature of above about 333° K., calculated as material temperature, and at a compressive stretching ratio of about 1.1, wherein a rolling force (sum of the forces acting on the bearings of the pressure or compression roll) of from about $7 \times 10^4$ N–$1.9 \times 10^5$ N is exerted in the nip on the workpiece and a second step of conducting a second compressive roll-stretching, said second compressive roll-stretching comprising re-setting the nip height of the original nip with a reduced nip height and reversing the workpiece to pass it through the original pair of compression rolls.

51. A process according to claim 50, wherein said temperature is above about 353 K, said pressure is from about 25 to 145 MPa and said compressive stretching ratio is above about 1.3.

52. A process according to claim 50, further comprising the step of applying a tensile force to the workpiece.

53. A process according to claim 50, wherein said rolling force is from about $1 \times 10^5$ N–$1.9 \times 10^5$ N.

54. A process for the production of fiber-free panels, panel-like molding or profiles of high mechanical strength according to claim 50.

55. A process for the production of fiber-free panels, webs, panel-like moldings or profiles of high mechanical strength from a plastic material which is a crystalline material or an amorphous material, comprising the sequential steps of:

a first compressive roll-stretching of a fiberfree plastic workpiece within a nip of at least one pair of pressure or compression rolls at roll and material temperatures below the melting point of said crystalline material or the softening range of said amorphous material, thereby to molecularly orient said workpiece, wherein the compressive roll-stretching of the workpiece takes place with the same or approximately the same circumferential speed of the pressure or compression rolls or without friction, at a pressure of from about 20 to 150 MPa and a temperature of above about 333° K., calculated as material temperature, and at a compressive stretching ratio of about 1.1, and a second step of conducting a second compressive roll-stretching, wherein said first compressive roll-stretching is done by at least one first pair of compression rolls, arranged at an angle of 1 to 89°, with respect to the running direction of the workpiece, and said second compressive roll-stretching is done by at least one second pair of compression rolls, arranged at an angle of 91 to 179° with respect to the running direction.

56. A process according to claim 55, wherein said temperature is above about 353 K, said pressure is from about 25 to 145 MPa and said compressive stretching ratio is above about 1.3.

57. A process according to claim 55, further comprising the step of applying a tensile force to the workpiece.

58. A process according to claim 55, wherein a rolling force (sum of the forces acting on the bearings of the pressure or compression roll) of from about $7 \times 10^4$ N–$1.9 \times 10^5$ N is exerted in the nip on the workpiece.

59. A process according to claim 58, wherein the rolling force is from about $1 \times 10^5$ N–$1.9 \times 10^5$ N.

* * * * *